United States Patent
Hill et al.

(10) Patent No.: US 10,102,448 B2
(45) Date of Patent: Oct. 16, 2018

(54) VIRTUAL CLOTHING MATCH APP AND IMAGE RECOGNITION COMPUTING DEVICE ASSOCIATED THEREWITH

(71) Applicant: EHDP STUDIOS, LLC, Edwardsville, IL (US)

(72) Inventors: Elizabeth Hill, Edwardsville, IL (US); Douglas Peterson, Edwardsville, IL (US)

(73) Assignee: EHDP Studios, LLC, Edwardsville, IL (US)

( * ) Notice: Subject to any disclaimer, the term of this patent is extended or adjusted under 35 U.S.C. 154(b) by 12 days.

(21) Appl. No.: 14/885,397

(22) Filed: Oct. 16, 2015

(65) Prior Publication Data
US 2017/0109609 A1 Apr. 20, 2017
US 2018/0068205 A9 Mar. 8, 2018

(51) Int. Cl.
G06K 9/62 (2006.01)
G06F 17/30 (2006.01)
G06Q 30/00 (2012.01)
G06K 9/00 (2006.01)

(52) U.S. Cl.
CPC ....... *G06K 9/6215* (2013.01); *G06F 17/3053* (2013.01); *G06Q 30/00* (2013.01); *G06K 9/00* (2013.01); *G06K 2209/27* (2013.01)

(58) Field of Classification Search
CPC .............. G06K 9/6215; G06F 17/3053; G06F 17/30256; G06F 17/30867
See application file for complete search history.

(56) References Cited

U.S. PATENT DOCUMENTS

| | | | | |
|---|---|---|---|---|
| 2002/0078043 A1* | 6/2002 | Pass | .................. | G06F 17/30256 |
| 2008/0159622 A1* | 7/2008 | Agnihotri | .......... | G06K 9/00228 |
| | | | | 382/157 |
| 2009/0060289 A1* | 3/2009 | Shah | .................. | G06K 9/00288 |
| | | | | 382/118 |

(Continued)

OTHER PUBLICATIONS

Natasha Baker, Apps aid fashionistas in tracking down desired clothing, shoes, www.reuters.com, Retrieved on Oct. 2, 2015, pp. 3.

(Continued)

*Primary Examiner* — Chan Park
*Assistant Examiner* — Elisa Rice
(74) *Attorney, Agent, or Firm* — Armstrong Teasdale LLP

(57) ABSTRACT

An image recognition (IR) computing device is provided herein, the IR computing device configured to receive a search request from a user computing device instructing the IR computing device to conduct a search for a subject clothing item pictured in a subject image, the search request including the subject image. The IR computing device is further configured to analyze the subject image and compare a plurality of vendor images to the subject image. The IR computing device may employ an object recognition component to analyze and compare the images. The IR computing device is further configured to generate a list of potential matches to the subject image, transmit the list of potential matches to the user computing device for display to a user within a clothing match app, and receive an indication from the user computing device of whether the search was successful or unsuccessful.

22 Claims, 7 Drawing Sheets

(56) References Cited

U.S. PATENT DOCUMENTS

| | | | |
|---|---|---|---|
| 2011/0106656 A1* | 5/2011 | Schieffelin | G06F 17/30802 |
| | | | 705/26.9 |
| 2011/0166898 A1* | 7/2011 | Zarrow | G06Q 10/02 |
| | | | 705/5 |
| 2012/0114248 A1* | 5/2012 | Yang | G06F 17/30256 |
| | | | 382/190 |

OTHER PUBLICATIONS

Racked, New App Helps You Find Cool Clothing You See on the Street, www.racked.com, Retrieved on Oct. 2, 2015, pp. 7.

Misty White Sidell, Shazam for fashion? Kate Bosworth's new iPhone app lets users find their dream clothes by just snapping the person wearing it, Daily Mail.com, Retrieved on Oct. 2, 2015, pp. 4.

Snap Fashion, How, www.snapfashion.co.uk/how, Retrieved on Oct. 2, 2015 pp. 12.

Ian Kersey, iOS App Snap Fashion Lets Users Find Clothing by Snapping a Picture, www.intomobile.com, Retrieved on Oct. 2, 2015, pp. 5.

\* cited by examiner

VIRTUAL CLOTHING MATCH APP AND IMAGE RECOGNITION COMPUTING DEVICE ASSOCIATED THEREWITH

BACKGROUND

This disclosure relates to image recognition and, more particularly, to an image recognition computing device and a clothing matching software application ("app") associated therewith for identifying a potential match to a clothing item pictured in a subject image.

It is a common experience for a person to see an item of clothing, such as a shirt or accessory, that the person would be interested in purchasing. For example, the person may see someone walking down the street wearing the clothing item, or may come upon a picture online including the clothing item. It may difficult to discern where the clothing item comes from (e.g., a manufacturer, brand, or vendor), and shopping around in stores or visiting numerous websites to attempt to locate the clothing item is incredibly time consuming and cumbersome. It would be desirable to provide the person with a simple and convenient method for identifying the clothing item.

BRIEF DESCRIPTION OF THE DISCLOSURE

In one aspect, an image recognition (IR) computing device including a processor in communication with a memory is provided. The said processor is programmed to receive a search request from a user computing device instructing the IR computing device to conduct a search for a subject clothing item pictured in a subject image, the search request including the subject image. The processor is also programmed to analyze the subject image, compare a plurality of vendor images to the subject image, and generate a list of potential matches. Each potential match includes one vendor image of the plurality of vendor images and a link to a vendor webpage that includes the at least one vendor image. The processor is further programmed to transmit the list of potential matches to the user computing device for display to a user associated with the user computing device, and receive an indication from the user computing device of whether the search was successful or unsuccessful.

In another aspect, a computer-implemented method for identifying a potential match to a clothing item pictured in a subject image using an image recognition (IR) computing device is provided. The IR computing device includes a processor in communication with a memory. The method includes receiving, from a user computing device, a search request instructing the IR computing device to conduct a search for a subject clothing item pictured in a subject image, the search request including the subject image. The method also includes analyzing the subject image, comparing a plurality of vendor images to the subject image, and generating a list of potential matches. Each potential match includes one vendor image of the plurality of vendor images and a link to a vendor webpage that includes the at least one vendor image. The method further includes transmitting, to the user computing device, the list of potential matches for display to a user associated with the user computing device, and receiving, from the user computing device, an indication of whether the search was successful or unsuccessful.

In yet another aspect, at least one non-transitory computer-readable storage media having computer-executable instructions embodied thereon is provided. When executed by at least one processor, the computer-executable instructions cause the processor to receive a search request from a user computing device instructing the IR computing device to conduct a search for a subject clothing item pictured in a subject image, the search request including the subject image. The computer-executable instructions also cause the processor to analyze the subject image, compare a plurality of vendor images to the subject image, and generate a list of potential matches. Each potential match includes one vendor image of the plurality of vendor images and a link to a vendor webpage that includes the at least one vendor image. The computer-executable instructions further cause the processor to transmit the list of potential matches to the user computing device for display to a user associated with the user computing device, and receive an indication from the user computing device of whether the search was successful or unsuccessful.

BRIEF DESCRIPTION OF THE DRAWINGS

FIG. 1 is a block diagram of a computer system including an image recognition computing device in accordance with one embodiment of the present disclosure.

FIG. 2 illustrates an example configuration of a client computing device shown in FIG. 1.

FIG. 3 illustrates an example configuration of a server system shown in FIG. 1.

FIG. 4 is a simplified block diagram illustrating the flow of data within the system shown in FIG. 1 and including a first example embodiment of a user interface of a clothing match app executed by the computer system shown in FIG. 1.

FIG. 5 is a second example embodiment of a user interface of a clothing match app executed by the computer system shown in FIG. 1.

FIG. 6 is a flowchart of a method for identifying a potential match to a clothing item pictured in a subject image.

FIG. 7 is a diagram of components of an example computing device that may be used in the computer system shown in FIG. 1.

Figure 1:
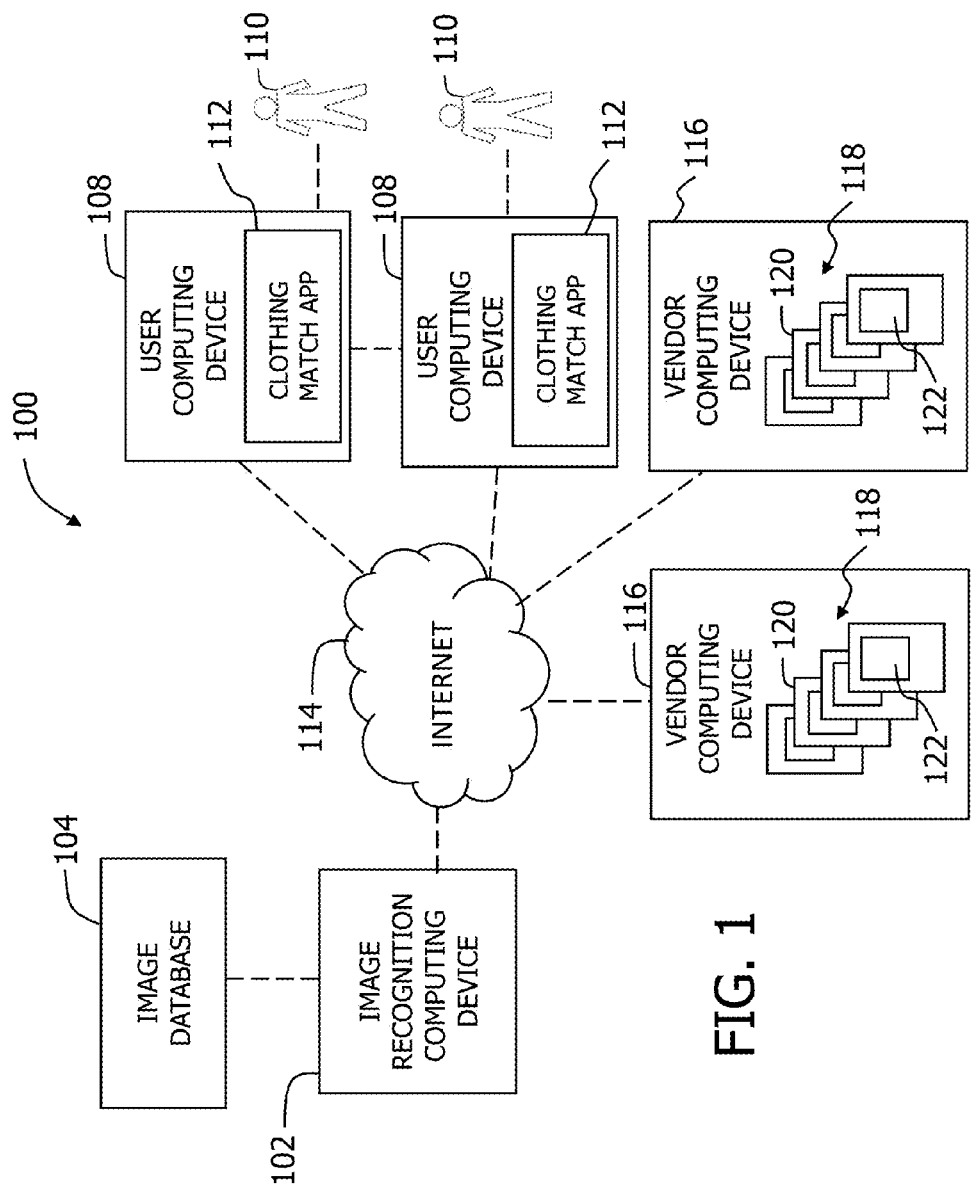
FIGS. 1-7 show example embodiments of the methods and systems described herein.

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The system described herein is configured to maintain and provide a clothing match app that a user may access, to analyze a subject image of a subject clothing item and find a potential match to the subject clothing item from a vendor. The system provides a list of potential matches to a user within the clothing match app on the user's computing device, as well as links (e.g., hyperlinks) to the vendor website at which a suitable match from the list of potential matches may be purchased by the user. In addition, the system provides a plurality of filters that the user may adjust to sort, rank, and/or filter the list of potential matches. If no suitable match is found during a user's search, the system logs the search as "unsuccessful." The system is further configured to re-run unsuccessful searches periodically, such that a suitable match may be found at a later date.

As used herein, "clothing" refers generally to items that may be worn by a user and includes, for example, but not limited to, clothes, shoes, accessories, jewelry, hats, eyewear, outerwear, undergarments. "Clothing" may alternately be referred to as "clothing item", "item", and/or "clothes". In addition, "vendor," as used herein, refers generally to merchants, users, or other parties that offer clothing for sale online. Moreover, "vendor" may further refer to those merchants, users, or other parties that have a relationship or have contracted with an owner of the system in order to have their clothing items searched using the clothing match app.

The system described herein includes an image recognition (IR) computing device, which itself includes a processor and a memory device. The IR computing device is in communication with at least one image database, which is configured to store various data, as described further herein. The IR computing device is also communicatively coupled to (e.g., wirelessly over the Internet) at least one user computing device, which is associated with a particular user. The IR computing device is configured to communicate with the user via a clothing match software application ("clothing match app") downloaded and installed on the user computing device. The user may create an account or "register" with the clothing match app. The user interacts with a user interface of the clothing match app to transmit information to and receive information from the IR computing device. Accordingly, where the clothing match app is referred to herein, it should be understood that the various inputs to and outputs from the clothing match app are associated with the IR computing device and are transmitted to/received from the same. In addition, it should be understood that the functionality of the clothing match app, as described herein, may be additionally or alternatively implemented on a web browser (e.g., a website maintained by and/or associated with the IR computing device) without departing from the scope of the disclosure.

The user captures a subject image of a subject clothing item that they are interested in. For example, the user sees an individual wearing a clothing item they are interested in purchasing and captures a subject image thereof. The subject image may be captured using a camera integral to the user's computing device and/or may be captured using a separate computing device (e.g., a digital camera) and later downloaded to the user computing device. Additionally or alternatively, the user may have an existing subject image of a clothing item (e.g., an image found online) that they wish to find potential matches for. The user accesses the clothing match app to transmit the subject image to the IR computing device with a search request.

The IR computing device receives a search request including the subject image from the user computing device. The IR computing device is configured to employ an object recognition component to perform image recognition or analysis on the subject image as well as on a plurality of vendor images to identify one or more potential match(es). In one embodiment, the object recognition component is trained to analyze clothing items. The object recognition component may include, for example, OpenCV, trained to recognize and analyze clothing using machine learning (e.g., a neural network). Training of the object recognition component may include feedback from the user that a search was successful, identification of suitable match(es) by the user. The object recognition component may return a confidence score, or a value representing how closely a vendor image matches the subject image. The object recognition component may additionally or alternatively be trained to change one or more weights associated with a vendor image, for example, in response to positive feedback from the user (e.g., an identification of the vendor image as a suitable match and/or an indication that a search including the vendor image was successful).

In addition, the IR computing device is configured to store the subject image, for example, in the image database at a file location associated with the user and/or the user's account with the clothing match app (e.g., using MySQL®; MySQL is a registered trademark of MySQL AB, Uppsala, Sweden). In certain embodiments, the IR computing device is configured to "pre-screen" the subject image prior to searching for potential matches, to determine if the subject image is "searchable." For example, the IR computing device may determine if the angle of the image and/or the quality of the image may prevent a successful or accurate search. If the IR computing device determines that the subject image is not searchable, the IR computing device may request that the user submit a different subject image. The IR computing device may suggest that the image be captured within a certain range of angles for the best results. The user may be able to override the IR computing device's request and direct the IR computing device to conduct the search using the original subject image. The user may alternatively submit a replacement subject image for searching.

In some embodiments, the IR computing device is configured to access websites and webpages associated with vendors to search vendors' images of clothing items for sale. The IR computing device may be configured to search these webpages using simulated web-browsing functionality. For example, the IR computing device may implement an algorithm to access a webpage and retrieve a vendor image of an associated clothing item from the webpage for image analysis. Each webpage includes a link associated therewith and may further include item characteristics associated with the item pictured in the vendor image (e.g., price, description, etc.). The IR computing device may retrieve the link and the item characteristics associated with each accessed vendor image before, during, or after analysis of the corresponding image. In certain embodiments, the IR computing device may only retrieve and/or store (either temporarily, for generating the list of potential matches, or in a file location associated with the user and with the current search) the link and item characteristics associated with those vendor images that are potential matches, to save processing time and memory. In some embodiments, the IR computing device may be configured to implement an algorithm that processes vendor webpages according to templates that correspond with the particular, unique layout of the associated vendor webpage. In some embodiments, the algorithm may be a "one size fits all" implementation that uses, for example, keywords, semantic processing, and/or other analysis to determine the location of the vendor image, link, and/or item characteristics on each vendor webpage.

In some embodiments, the IR computing device is configured to access the image database to search vendors' images of clothing items for sale. In these embodiments, the image database is configured to store a vendor image of each clothing item available from each vendor. Each vendor image may be indexed according to the vendor(s) offering the corresponding item for sale and may have a link (e.g., a hyperlink) to a webpage or the corresponding vendor associated therewith. In addition, each vendor image may be indexed according to characteristics or attributes of the corresponding item, such as price, color, style (e.g., "shirt" or "pants"), size, or additional item details (e.g., "sleeveless," "leather," "limited availability"). The characteristics may be used by the IR computing device to more quickly analyze the vendor images in the image database to generate the list of potential matches. For example, if the subject image includes a blue shirt, the IR computing device may only retrieve those vendor images indexed as "blue" and/or "shirt" to further analyze. This saves processing time over analyzing every single vendor image in the image database.

The IR computing device generates a list of potential matches (i.e., search results) based on the image recognition. The list includes vendor images that the IR computing device has identified as potential matches for the subject image. In some embodiments, a vendor image is identified as a potential match if image recognition performed on that vendor image returns a match confidence score above a predefined threshold (e.g., how closely a stored value representing a degree to which vendor image must match the subject image). The IR computing device returns the list of potential matches to the user computing device, for example, for the user to view in a user interface of the clothing match app. The IR computing device may further store the list of potential matches in a file location associated with the user (e.g., for the user to access the list at a later time) and/or may log each potential match in a separate file location, such that the IR computing device may track and/or identify "trending" items (e.g., items pictured in vendor images that are frequently returned to users as potential matches and/or that are identified as suitable matches).

The IR computing device associates (e.g., labels, indexes, and/or tags) each vendor image on the list of potential match with the corresponding vendor selling the item pictured in the vendor image. The IR computing device further associates each potential match to the corresponding vendor by including a link to a webpage maintained by the corresponding vendor with the potential match, such that the user may conveniently locate and purchase the item pictured in the vendor image. The user may identify any potential match(es) as a "suitable match," wherein that potential match includes a vendor image of a clothing item that satisfies the user's search. In some cases, a suitable match may include a clothing item that exactly matches the subject clothing item pictured in the subject image (an "exact match"). In other cases, a suitable match may include a clothing item similar to the subject clothing item, whether or not an exact match was included in the list of potential matches. For example, the user may identify an exact match in the list of potential items but discover that the exact match is not a clothing item they wish to purchase (e.g., the clothing item is too expensive, is not sold in their size, etc.). The user may further identify a different suitable match including a clothing item that may look similar to the exact match but may be more suitable to the needs, interests, or desires of the user (e.g., may be more affordable, may be available in the correct size, may be more "the user's style", etc.). In such cases, the IR computing device may instruct the clothing match app to prompt the user to identify both the exact match as well as the (other) suitable match(es) (the clothing item(s) that the user selects, for example, to purchase).

The IR computing device receives any and all user identification(s) of suitable match(es) from the user computing device. In some embodiments, "identification" of the potential match as a suitable match may be passive. For example, the user selecting the potential match to view the corresponding vendor image and/or vendor webpage, whether or not the user purchases the item, may be transmitted to the IR computing device from the user computing device, and may be classified by the IR computing device as an identification of that potential match as a suitable match.

In some embodiments, the IR computing device may instruct the clothing match app may prompt the user for active identification of suitable matches. For example, the clothing match app may present a dialog or text box explicitly asking the user to select (i.e., identify) whether an exact match is present on the list of potential matches and/or if there is another suitable match on the list of potential matches.

The clothing match app may obtain an indication of whether the search was "successful" (i.e., a suitable match was identified by the user) or "unsuccessful" (i.e., no suitable match was found). The clothing match app may automatically determine that the search was successful if any suitable match is identified by the user, and, in the alternative, determine that the search was unsuccessful if no suitable match is identified by the user. Additionally or alternatively, the clothing match app may actively prompt the user to make such an indication, for example, using a dialog box (e.g., "Was this search successful?" or "Did you find what you were looking for?"). If the search is indicated as "unsuccessful," the IR computing device is configured to store the search request and/or the returned list of potential matches in a file location associated with the user and with that search. The IR computing device is further configured to re-run unsuccessful searches periodically. For example, the IR computing device may re-run each unsuccessful search after a particular time interval (e.g., after two weeks or a month has passed) or based on another threshold event (e.g., ten new or additional vendors have been added to the field of search for the IR computing device).

In some embodiments, the IR computing device may return only newly retrieved potential matches to the user to view (i.e., will not return any potential matches previously presented to the user for that search). In some embodiments, the IR computing device may return newly retrieved as well as previously presented potential matches to the user to view. The newly retrieved potential matches may be visually differentiated from the previously presented matches (e.g., in a separate section, highlighted, and/or presented in a different color). The IR computing device may continue to re-run the search until the search is indicated as successful, or until the user indicates that they do not want the search re-run (e.g., the user is no longer interested in identifying the subject clothing item).

In some embodiments, the user may save a search, whether it was identified as successful or unsuccessful. The user may then choose to view the list of potential matches at a later time. Additionally or alternatively, by saving the search, the user may be able to re-run the same search request (i.e., with the same search criteria) at a later time. The user may specify that they only want to view newly retrieved potential matches or view newly retrieved as well as previously presented potential matches.

In addition, the clothing match app may provide the user with a plurality of filters to sort, rank, and/or filter the returned list of potential matches. These filters may be referred to as "potential match filters." The user may select one or more potential match filters to filter the returned list according to, for example, at least one of price, vendor, item popularity (e.g., how often the corresponding item is returned as a potential match), color, available size(s), gender (e.g., men's or women's clothing), clothing type (e.g., "dress" or "shirt"), and/or confidence score (e.g., how closely the vendor image matched the subject image). If the user does not select a potential match filter, the list of potential matches may be sorted according to a default sorting algorithm (e.g., trending or popular items listed first, closer matches first, etc.).

In certain embodiments, the clothing match app may provide the user a list of filters to select before a search is conducted by the IR computing device, to narrow the field of search. These filters may be referred to as "search filters". Search filters may include additional, fewer, and/or the same filter fields as the potential match filters described above (e.g., at least one of price, vendor, item popularity, color, gender, available size(s), clothing type and/or confidence score). In such embodiments, the user may select one or more search filters, select a subject image, and transmit a search request including the search filters and the subject image. Alternatively, the user may select one or more search filters and transmit the search request including only the selected search filters. The IR computing device may accordingly be configured to search the vendor webpages and/or the image database to generate the list of potential matches, wherein the potential matches include clothing items matching the search filters.

The methods and systems described herein may be implemented using computer programming or engineering techniques including computer software, firmware, hardware, or any combination or subset therefor. At least one of the technical problems addressed by this system includes: (i) cumbersome and time-consuming searching by a user of stores and vendor websites to find an item of interest; and (ii) increased difficulty in locating an item of interest that matches the user's needs (e.g., budget concerns).

The technical effect of the systems and methods described herein is achieved by performing at least one of the following steps: (a) receiving, from a user computing device, a search request instructing the IR computing device to conduct a search for a subject clothing item pictured in a subject image, the search request including the subject image; (b) analyzing the subject image; (c) comparing a plurality of vendor images to the subject image; (d) generating a list of potential matches, each potential match including one vendor image of the plurality of vendor images and a link to a vendor webpage that includes the at least one vendor image; (e) transmitting, to the user computing device, the list of potential matches for display to a user associated with the user computing device; and (f) receiving, from the user computing device, an indication of whether the search was successful or unsuccessful.

The resulting technical effect achieved is at least one of: (i) applying computerized image recognition to items of interest that is trained and retrained according to user feedback to continually enhance the accuracy thereof; (ii) enhanced user experience with improved search results; and (iii) enhanced user experience with results tailored to the user's needs.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to software applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a block diagram of a computer system 100 including an image recognition (IR) computing device 102. IR computing device 102 includes at least one processor in communication with a memory. IR computing device 102 is in communication with an image database (memory) 104 containing information on a variety of matters, including user account information with the clothing match app, saved searches and/or lists of potential matches, unsuccessful search requests, logs of suitable matches, stored images (e.g., stored subject images and/or vendor images of items offered for sale associated with particular vendor(s)), and/or other information described elsewhere herein. In one embodiment, image database 104 is stored on IR computing device 102. In any alternative embodiment, image database 104 is stored remotely from IR computing device 102 and may be non-centralized.

In the example embodiment, computer system 100 further includes a plurality of client subsystems, also referred to as client systems or user computing devices 108. In one embodiment, user computing devices 108 are computers including a web browser, such that IR computing device 102 is accessible to user computing devices 108 using the Internet 114. User computing devices 108 are interconnected to Internet 114 through many interfaces including a network, such as a local area network (LAN) and/or a wide area network (WAN), dial-in connections, cable modems, wireless-connections, and special high-speed ISDN lines. User computing devices 108 may be any device capable of interconnecting to the Internet including a mobile computing device, such as a laptop or desktop computer, a web-based phone (e.g., a "smartphone"), a personal digital assistant (PDA), a tablet or phablet, a "smart watch" or other wearable device, or other web-connectable equipment. Although two user computing devices 108 are shown in FIG. 1 for clarity, it should be understood that computer system 100 may include any number of user computing devices 108.

IR computing device 102 is configured to communicate with a user computing device 108 associated with a user 110. User computing device 108 is configured to execute for display a clothing match app 112, which enables communication between user 110 and IR computing device 102, including transmitting search requests to and receiving potential matches from IR computing device 102.

In addition, computer system 100 includes vendor computing devices 116, which may include any computing device capable of connecting to Internet 114. In particular, vendor computing devices 116 are configured to store and maintain at least one vendor website 118, each vendor website 118 including at least one vendor webpage 120. At least one of the vendor webpages 120 offer a clothing item for sale, and including at least a vendor image 122 associated with that clothing item and an item description (not shown). For example, a vendor website 118 may be a brand website 118, including multiple webpages 120 detailing various clothing items for sale therefrom. Vendor computing devices 116 may include databases and/or server computing devices.

In the example embodiment, IR computing device 102 receives a search request from user computing device 108. The search request may include a subject image of a subject clothing item that user 110 wishes to identify. The search request may additionally or alternatively include one or more search filters to narrow the field of the search implemented by IR computing device 102. IR computing device 102 may store the subject image and/or the search request in a file location in image database 104 associated with user 110. IR computing device 102 performs image recognition or analysis on the subject image, where applicable. IR computing device 102 then searches vendor webpages 120 for vendor images 122 of clothing items. In some embodiments, IR computing device 102 accesses Internet 114 with simulated web-browsing functionality to communicated with vendor computing devices 116 to search vendor webpages 120 maintained thereon. IR computing device 102 analyzes vendor images 122 and generates a list of potential matches of the subject image and/or the search filters. In one embodiment, vendor images 122 that match the subject image with a confidence score higher than a predetermined threshold are automatically added to the list of potential matches. Each potential match includes a vendor image 122 of the potentially matching clothing item and a link to the vendor webpage 120 at which user 110 may purchase the clothing item pictured in the corresponding vendor image 122. IR computing device 102 stores the list of potential matches and/or a log of the search request and/or search results at image database 104 in a file location associated with user 110. IR computing device 102 further returns the list of potential matches to user computing device 108. User computing device 108 executes clothing match app 112 to display the list of potential matches to user 110.

User computing device 108 transmits to IR computing device 102 any identification of a suitable match from user 110. In one embodiment, if any identification of a suitable match is received, the search is indicated as successful (e.g., by indexing the stored log of the search in image database 104 with a "successful" tag). If no such identification is received, the search is indicated as unsuccessful. IR computing device 102 is configured to re-run unsuccessful searches periodically.

Figure 2:
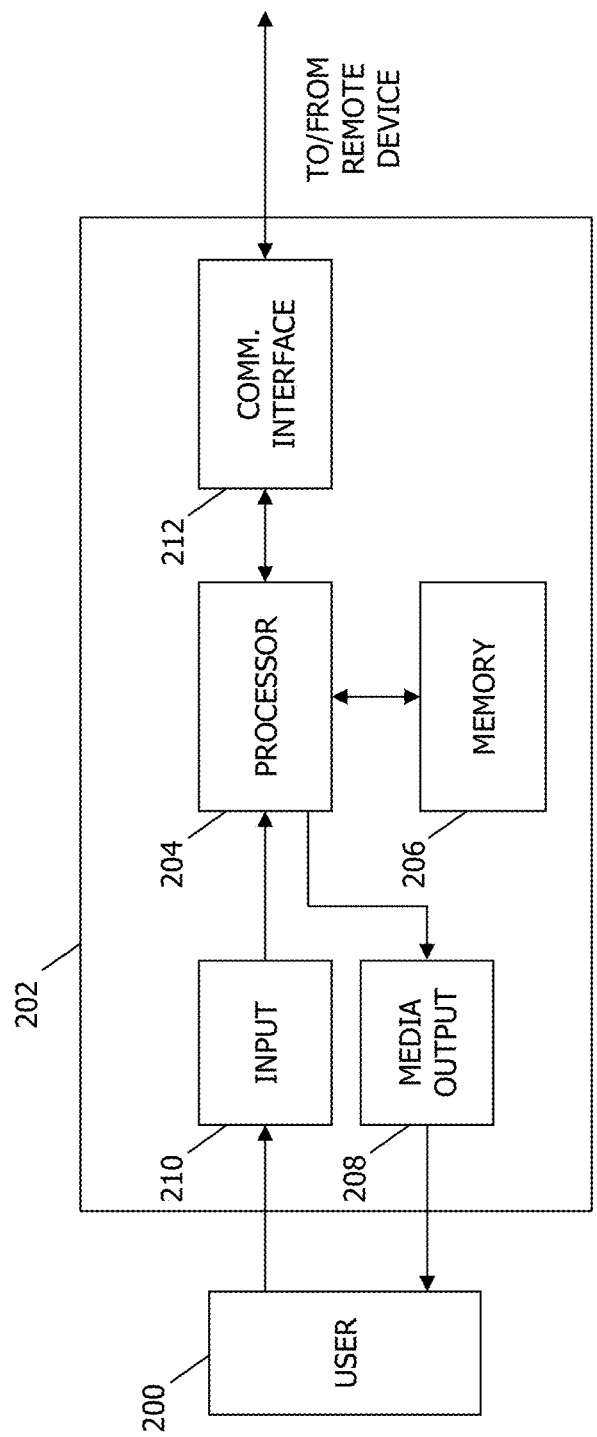

FIG. 2 illustrates an example configuration of a client computing device 202. Client computing device 202 may include, but is not limited to, client systems ("user computing devices") 108 (shown in FIG. 1). Client computing device 202 includes a processor 204 for executing instructions. In some embodiments, executable instructions are stored in a memory area 206. Processor 204 may include one or more processing units (e.g., in a multi-core configuration). Memory area 206 is any device allowing information such as executable instructions and/or other data to be stored and retrieved. Memory area 206 may include one or more computer-readable media.

Client computing device 202 also includes at least one media output component 208 for presenting information to a user 200 (e.g., a user 110, shown in FIG. 1). Media output component 208 is any component capable of conveying information to user 200. In some embodiments, media output component 208 includes an output adapter such as a video adapter and/or an audio adapter. An output adapter is operatively coupled to processor 204 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 202 includes an input device 210 for receiving input from user 200. Input device 210 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 208 and input device 210.

Client computing device 202 may also include a communication interface 212, which is communicatively coupleable to a remote device such as image recognition (IR) computing device 102 (shown in FIG. 1). Communication interface 212 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 206 are, for example, computer-readable instructions for providing a user interface to user 200 via media output component 208 and, optionally, receiving and processing input from input device 210. A user interface may include, among other possibilities, a web browser and client software application. Web browsers enable users 200 to display and interact with media and other information typically embedded on a web page or a website from a web server associated with a merchant. A client software application allows users 200 to interact with a server application associated with, for example, computer system 100 (shown in FIG. 1).

Figure 3:
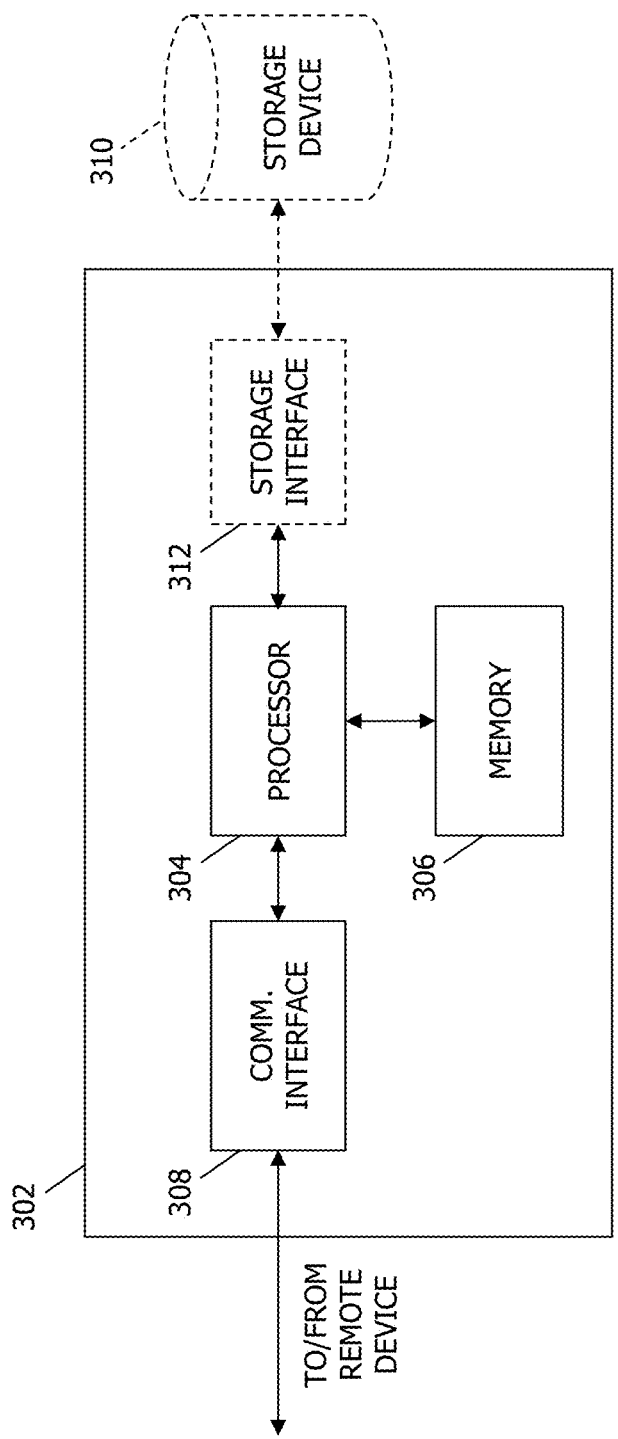

FIG. 3 illustrates an example configuration of a server computing device 302. Server computing device 302 may include, but is not limited to, image recognition (IR) computing device 102 and/or vendor computing devices 116 (both shown in FIG. 1). Server computing device 302 includes a processor 304 for executing instructions. Instructions may be stored in a memory area 306, for example. Processor 304 may include one or more processing units (e.g., in a multi-core configuration).

Processor 304 is operatively coupled to a communication interface 308 such that server computing device 302 is capable of communicating with a remote device such as client computing device 202 or another server computing device 302. For example, communication interface 308 may receive requests from user computing devices 204 via the Internet, as illustrated in FIG. 1.

Processor 304 may also be operatively coupled to a storage device 310. Storage device 310 is any computer-operated hardware suitable for storing and/or retrieving data. In some embodiments, storage device 310 is integrated in server computing device 302. For example, server computing device 302 may include one or more hard disk drives as storage device 310. In other embodiments, storage device 310 is external to server computing device 302 and may be accessed by a plurality of server computing devices 302. For example, storage device 310 may include multiple storage units such as hard disks or solid state disks in a redundant array of inexpensive disks (RAID) configuration. Storage device 310 may include a storage area network (SAN) and/or a network attached storage (NAS) system.

In some embodiments, processor 304 is operatively coupled to storage device 310 via a storage interface 312. Storage interface 312 is any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Memory areas 310 and 206 (shown in FIG. 2) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
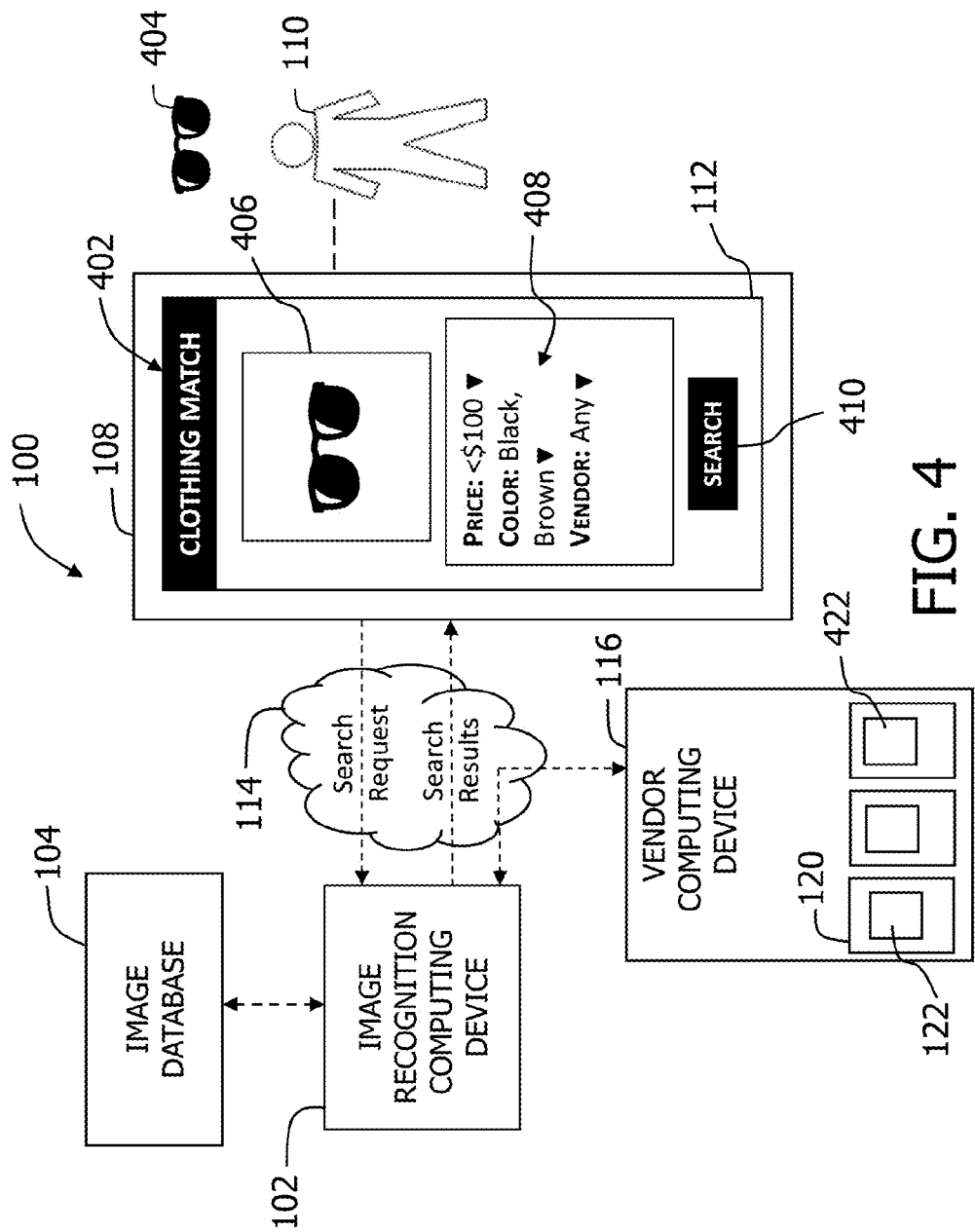

FIG. 4 is a simplified block diagram illustrating the flow of data within computer system 100 (shown in FIG. 1). In addition, FIG. 4 illustrates a first example embodiment of a user interface 402 of clothing match app 112. In the illustrated embodiment, user 110 is interested in a subject clothing item 404 and captures a subject image 406 thereof. Subject clothing item 404 is illustrated as a pair of sunglasses, but it should be understood that any other subject clothing item may be pictured in subject image 406 without departing from the scope of the present disclosure. In some embodiments, user 110 may capture subject image 406 using a camera integral to user computing device 108. In other embodiments, user 110 may capture subject image 406 using a camera separate from user computing device 108 (e.g., a digital camera or a different user computing device) and subsequently download subject image 406 onto user computing device 108.

In the illustrated embodiment, clothing match app 112 includes a plurality of search filters 408 with which user 110 may interact to narrow the field of search (to be conducted by IR computing device 102) and/or to narrow the list of potential matches (to be generated by IR computing device 102) before it is presented to user 110. User 110 uses search filters 408 to narrow the price and color of the potential matches to be shown to user 110. It should be understood that though only three search filters 408 are shown, additional, fewer, or different search filters may be provided to user 110 in clothing match app 112.

User 110 selects a search command 410 to transmit a search request to IR computing device 102. In the illustrated embodiment, the search request includes subject image 406 and search filters 408. IR computing device 102 performs image recognition on subject image 406 and on a plurality of vendor images 122 that IR computing device 102 retrieves from at least one of image database 104 and vendor computing device 116 using internet 114. IR computing device 102 also retrieves additional information associated with each of the plurality of vendor images 122, including links to corresponding vendor webpages 120 and clothing item characteristics associated with each vendor image 122. IR computing device 102 compares each of the plurality of vendor images 122 to subject image 406 and generates a list of potential matches including associated vendor images 122. IR computing device 102 may only compare those vendor images 122 (i.e., perform image recognition on those vendor images 122) that meet the criteria specified using search filters 408. For example, if IR computing device 102 retrieved a first vendor image 422 and associated item characteristics that identified the clothing item pictured in first vendor image 422 to cost more than $100, IR computing device 102 may not compare first vendor image 422 to subject image 406, to save processing time.

IR computing device 102 is further configured to return the list of potential matches to user computing device 108. User computing device 108 executes clothing match app 112 for display of the list of potential matches on user interface 402 (see FIG. 5).

Figure 5:
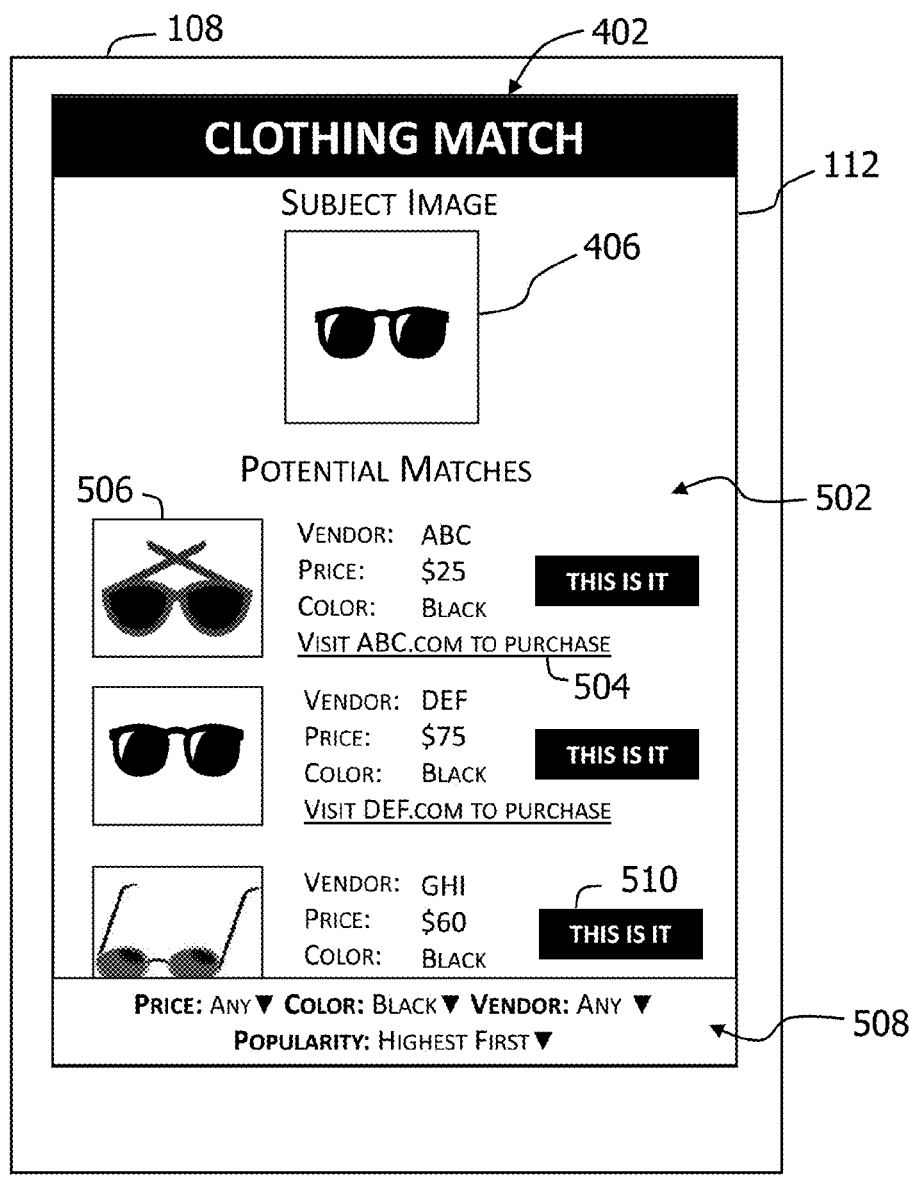

FIG. 5 is a second example embodiment of user interface 402 of clothing match app 112, as shown in FIGS. 1 and 4. More specifically, user interface 402 displays a list of potential matches 502 to subject image 406, as received at user computing device 108 from IR computing device 102 (both shown in FIG. 1). The list of potential matches 502 includes, for each potential match, a vendor image 506 of an associated clothing item; vendor details and item characteristics; and a link 504 to a vendor webpage (e.g., vendor webpage 120, shown in FIGS. 1 and 4) of the respective vendor selling the clothing item pictured in the vendor image 506. User interface 402 further includes potential match filters 508. It should be understood that though four potential match filters 508 are illustrated, user interface 402 may include any number of potential match filters. In certain embodiments, potential match filters 508 may correspond to search filters 408 (shown in FIG. 4). For example, user 110 (shown in FIGS. 1 and 4) selected a price search filter 408 that directed IR computing device 102 to only return potential matches with prices less than $100. Accordingly, a price potential match filter 508 may only include filter options or criteria for potential matches under $100 (e.g., $0-$50 and $50-100).

In the illustrated embodiment, each potential match further includes an identification command 510, illustrated as a "THIS IS IT" button 510. User 110 may select the identification command 510 corresponding to any potential match to identify that potential match as a suitable match. In some embodiments, upon such a selection, clothing match app 112 may prompt user 110 to specify whether the suitable match is an exact match or whether user 110 selected a different potential match as a suitable match because, for example, no exact match was found, or user 110 preferred that clothing item over the exact match. In some embodiments, selection of any identification comment 510 indicates to IR computing device 102 that the search was successful. IR computing device 102 may store a log of all suitable matches identified by selection of an identification command 510 in, for example, image database 104. IR computing device 102 may use the log of suitable matches to train its image recognition component and/or to monitor popular or trending clothing items. In some embodiments, each link 504 may be configured as an identification command 510. More specifically, selection by user 110 of a link 504 may be considered identification of the corresponding potential match as a suitable match, by IR computing device 102.

Figure 6:
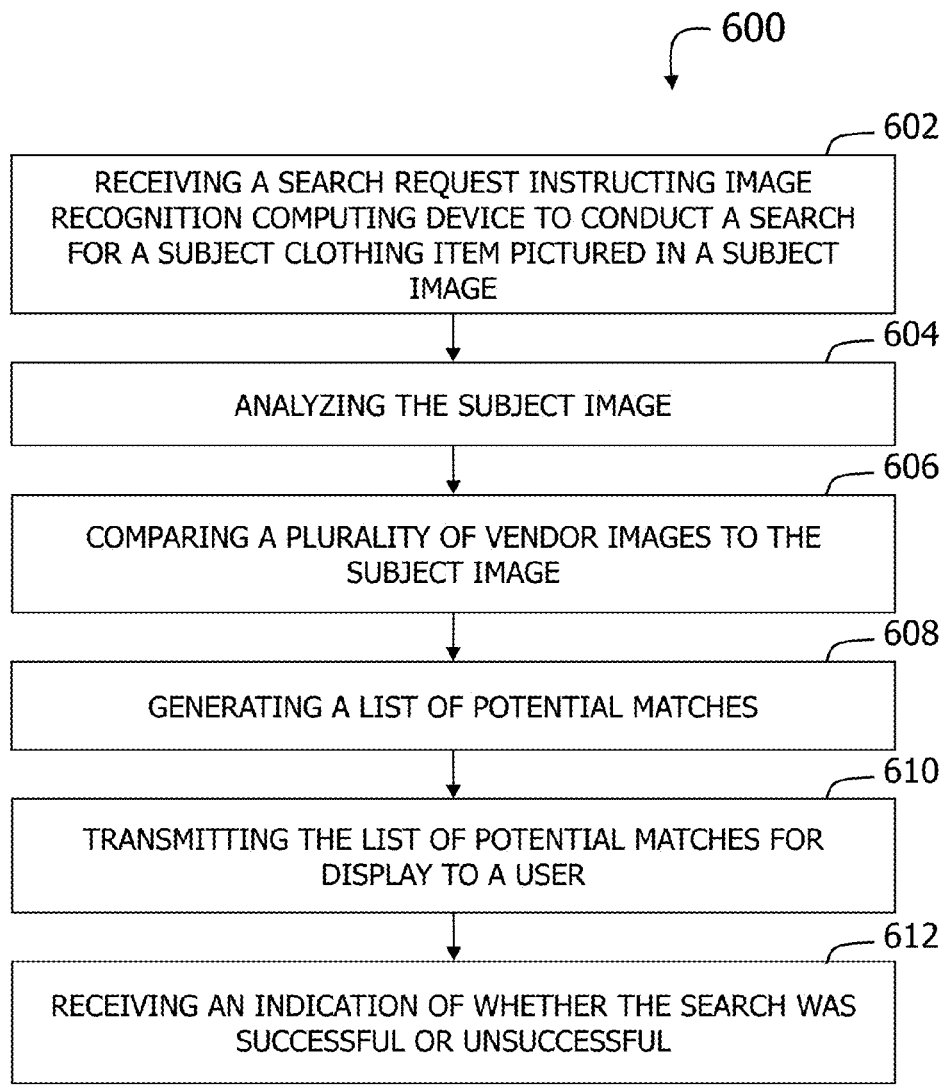

FIG. 6 is a flowchart of a method 600 for identifying a potential match to a clothing item pictured in a subject image. Method 600 may be implemented by an image recognition computing device (e.g., IR computing device 102, shown in FIG. 1). In the example embodiment, method 600 includes receiving 602 a search request instructing the IR computing device to conduct a search for a subject clothing item pictured in a subject image (e.g., subject image 406, shown in FIG. 4). The search request, which is received 602 from a user computing device (e.g., user computing device 108, shown in FIG. 1), includes the subject image. Method 600 also includes analyzing 604 the subject image and comparing 606 a plurality of vendor images (e.g., vendor images 122, shown in FIG. 1) to the subject image. In certain embodiments, the IR computing device employs an object recognition component trained for recognizing clothing items to analyze the subject image and compare the plurality of vendor images thereto.

Method 600 further includes generating 608 a list of potential matches (e.g., list 502, shown in FIG. 5), each potential match including one vendor image of the plurality of vendor images and a link (e.g., link 504, also shown in FIG. 5) to a vendor webpage (e.g., vendor webpage 120, shown in FIG. 1) that includes the at least one vendor image. Method 600 also includes transmitting 610 the list of potential matches to the user computing device for display to a user (e.g., user 110, shown in FIG. 1) associated with the user computing device. The user computing device may execute a clothing match app (e.g., clothing match app 112, shown in FIG. 1) to display the list of potential matches to the user. Method 600 still further includes receiving 612, from the user computing device, an indication of whether the search was successful or unsuccessful. It should be understood that method 600 may include additional, fewer, or different steps, including those described elsewhere herein.

Figure 7:
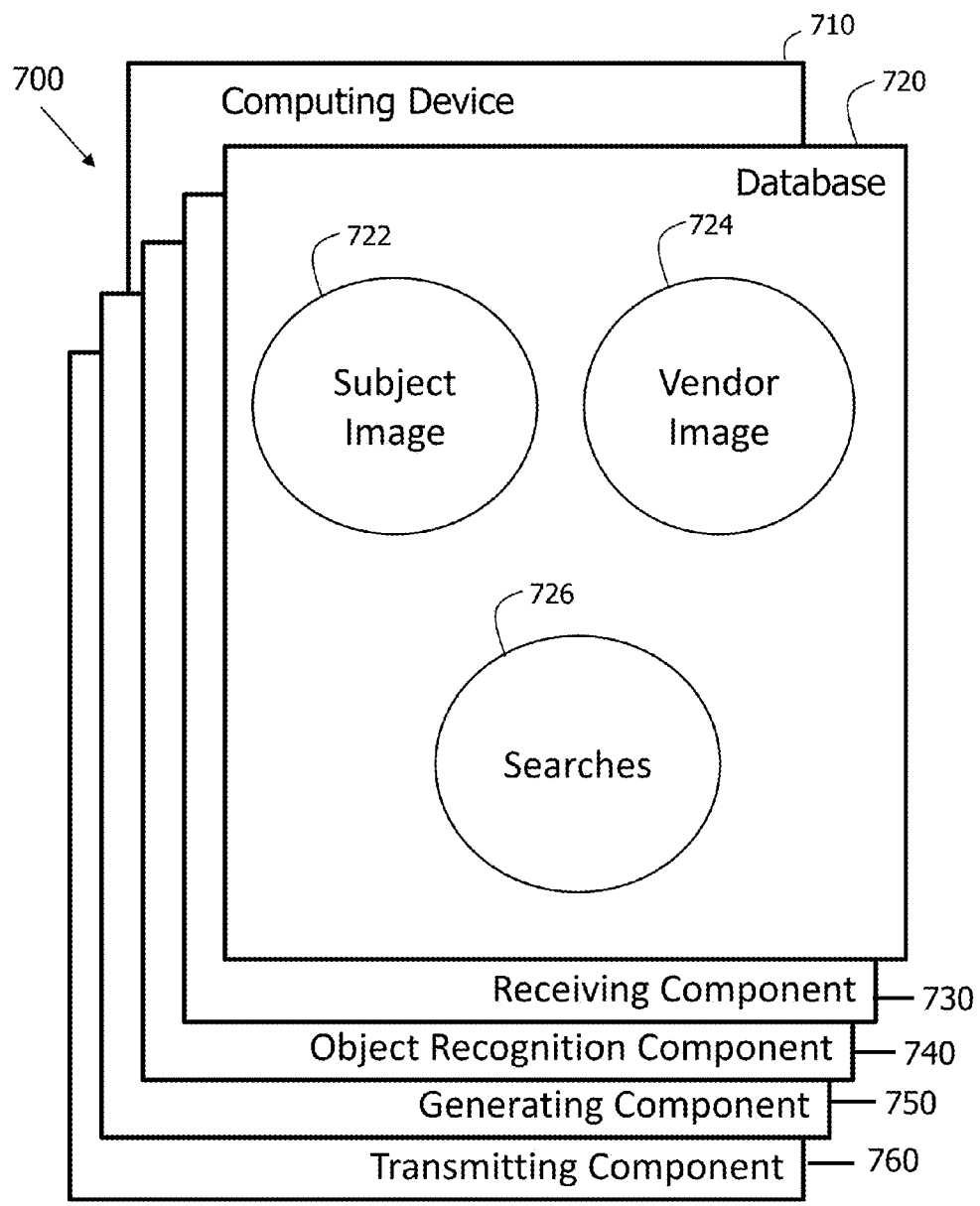

FIG. 7 is a diagram 700 of components of an example computing device 710 that may be used in computer system 100 shown in FIG. 1. In some embodiments, computing device 720 is similar to IR computing device 102 (shown in FIG. 1). A database 720 may be coupled with several separate components within computing device 710, which perform specific tasks. In this embodiment, database 720 includes subject images 722 (stored, for example, after computing device 710 receives a search request), vendor images 724 (retrieved from vendor webpages), and searches 726 (e.g., a log of completed searches 726 and corresponding successful/unsuccessful indicators). In some embodiments, database 720 is similar to image database 104 (shown in FIG. 1).

In the example embodiment, computing device 710 includes a receiving component 730. Receiving component 730 is configured to receive a search request from a user computing device, the search request instructing computing device 710 to conduct a search for a subject clothing item pictured in a subject image 722. The search request includes the subject image 722, which may be subsequently stored in database 720. After computing device 710 completes the search 726 and delivers the results to a user, receiving component 730 is further configured to receive an indication from the user of whether the search 726 was successful or unsuccessful. The search 726 may be subsequently logged in database 720 along with the indication.

Computing device 710 further includes an object recognition component 740. Object recognition component 740 is configured to analyze the subject image 722, and compare a plurality of vendor images 724 to the subject image 722. Computing device 710 also include a generating component 750 configured to generate a list of potential matches to the subject image 722 based on the output from object recognition component 740 (e.g., confidence scores or adjusted weighting factors). In one embodiment, each potential match includes one vendor image 726 of and a link to a vendor webpage that includes the at least one vendor image 726, such that the user may purchase the item pictured in the vendor image 726 from the vendor webpage. Computing device 710 also includes a transmitting component 760, configured to transmit the list of potential matches generated by generating component 750 to the user computing device for display to the user (e.g., by executing clothing match app 112, shown in FIG. 1, on the user computing device).

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the image recognition (IR) computing device are described herein as including general processing and memory devices, it should be understood that the IR computing device is a specialized computer configured to perform the steps described herein for identifying a list of potential matches of clothing items to a subject clothing item pictured in a subject image, using image recognition.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An image recognition (IR) computing device including a processor in communication with a memory, wherein said processor is programmed to:
   store a plurality of vendor images indexed in a database according to a set of characteristics associated with the plurality of vendor images;
   receive a search request from a user computing device instructing the IR computing device to conduct a search for a subject clothing item pictured in a subject image, the search request including the subject image;
   determine whether the subject image is searchable by evaluating an angle of the subject image based on a range of angles and a quality of the subject image;
   if the determination is that the subject image is not searchable, suggest, via the user computing device, to capture the subject image within the range of angles;
   analyze the subject image to determine one or more characteristics associated with the subject image;
   filter the plurality of vendor images to determine a subset of vendor images;
   compare the subset of vendor images to the subject image;
   generate a list of potential matches, each potential match including at least one vendor image of the plurality of vendor images and a link to a vendor webpage that includes the at least one vendor image;
   transmit the list of potential matches to the user computing device for display to a user associated with the user computing device; and
   receive an indication from the user computing device of whether the search was successful or unsuccessful.

2. The IR computing device of claim 1, wherein said processor is further programmed to:
   generate a respective confidence score for each of the plurality of vendor images;
   compare each respective confidence score to a predefined threshold score;
   determine that at least one confidence score satisfies the predefined threshold score; and
   for the vendor image corresponding to the at least one confidence score determine to satisfy the predefined threshold score, automatically add a potential match including the corresponding vendor image to the list of potential matches.

3. The IR computing device of claim 1, wherein said processor is further programmed to:
   receive, from the user computing device, an identification of a suitable match from the user from the list of potential matches; and
   indicate that the search was successful.

4. The IR computing device of claim 1, wherein said processor is further programmed to:
   receive, from the user computing device, an indication that the user identified no suitable matches from the list of potential matches; and
   indicate that the search was unsuccessful.

5. The IR computing device of claim 4, wherein said processor is further programmed to re-conduct each unsuccessful search periodically.

6. The IR computing device of claim 1, wherein said processor is further programmed to:
   determine the image is not searchable based at least on the evaluation of one of the angle of the subject image and the quality of the subject image;
   generate a request to submit a different subject image; and
   transmit the request to the user computing device.

7. The IR computing device of claim 1, wherein said processor is further programmed to:
   search a plurality of vendor webpages for the plurality of vendor images to compare to the subject image, each vendor webpage including at least one vendor image of the plurality of vendor images; and
   for each potential match, retrieve item characteristics for a clothing item pictured in the corresponding vendor image from the associated vendor webpage.

8. The IR computing device of claim 1, wherein said processor is programmed to employ an object recognition component trained for recognizing clothing items to analyze the subject image and compare the plurality of vendor images thereto.

9. The IR computing device of claim 1, wherein said processor is further programmed to determine the subject image is searchable by evaluating an angle of the subject image and a quality of the subject image.

10. A computer-implemented method for identifying a potential match to a clothing item pictured in a subject image using an image recognition (IR) computing device including a processor in communication with a memory, said method comprising:
    storing a plurality of vendor images indexed in a database according to a set of characteristics associated with the plurality of vendor images;
    receiving, from a user computing device, a search instructing the IR computing device to conduct a search for a subject clothing item pictured in a subject image, the search request including the subject image;
    determining the subject image is searchable by evaluating an angle of the subject image based on a range of angles and a quality of the subject image;
    if the determination is that the subject image is not searchable, suggesting, via the user computing device, to capture the subject image within the range of angles;
    analyzing the subject image to determine one or more characteristics associated with the subject image;
    filtering the plurality of vendor images to determine a subset of vendor images;
    comparing the subset of vendor images to the subject image;
    generating a list of potential matches, each potential match including at least one vendor image of the plurality of vendor images and a link to a vendor webpage that includes the at least one vendor image;
    transmitting, to the user computing device, the list of potential matches for display to a user associated with the user computing device; and
    receiving, from the user computing device, an indication of whether the search was successful or unsuccessful.

11. The computer-implemented method of claim 10, further comprising:
    generating a respective confidence score for each of the plurality of vendor images;
    comparing each respective confidence score to a predefined threshold score;
    determining that at least one confidence score satisfies the predefined threshold score; and
    for the vendor image corresponding to the at least one confidence score determine to satisfy the predefined threshold score, automatically adding a potential match including the corresponding vendor image to the list of potential matches.

12. The computer-implemented method of claim 10, wherein receiving an indication of whether the search was successful or unsuccessful comprises:

receiving, from the user computing device, an identification of a suitable match from the user from the list of potential matches; and
indicating that the search was successful.

13. The computer-implemented method of claim 10, wherein receiving an indication of whether the search was successful or unsuccessful comprises:
receiving, from the user computing device, an indication that the user identified no suitable matches from the list of potential matches; and
indicating that the search was unsuccessful.

14. The computer-implemented method of claim 13, further comprising periodically re-conducting each unsuccessful search.

15. The computer-implemented method of claim 10, further comprising:
searching a plurality of vendor webpages for the plurality of vendor images to compare to the subject image, each vendor webpage including at least one vendor image of the plurality of vendor images; and
for each potential match, retrieving item characteristics for a clothing item pictured in the corresponding vendor image from the associated vendor webpage.

16. The computer-implemented method of claim 10, wherein analyzing the subject image and comparing a plurality of vendor images to the subject image comprises employing an object recognition component trained for recognizing clothing items to analyze the subject image and compare the plurality of vendor images thereto.

17. At least one non-transitory computer-readable storage media having computer-executable instructions embodied thereon, wherein when executed by at least one processor, the computer-executable instructions cause the processor to:
store a plurality of vendor images indexed in a database according to a set of characteristics associated with the plurality of vendor images;
receive a search request from a user computing device instructing the IR computing device to conduct a search for a subject clothing item pictured in a subject image, the search request including the subject image;
determine the subject image is searchable by evaluating an angle of the subject image based on a range of angles and a quality of the subject image;
if the determination is that the subject image is not searchable, suggest, via the user computing device, to capture the subject image within the range of angles;
analyze the subject image to determine one or more characteristics associated with the subject image;
filter the plurality of vendor images to determine a subset of vendor images;
compare the subset of vendor images to the subject image;
generate a list of potential matches, each potential match including at least one vendor image of the plurality of vendor images and a link to a vendor webpage that includes the at least one vendor image;
transmit the list of potential matches to the user computing device for display to a user associated with the user computing device; and
receive an indication from the user computing device of whether the search was successful or unsuccessful.

18. The computer-readable storage media of claim 17, wherein the computer-executable instructions further cause the processor to:
generate a respective confidence score for each of the plurality of vendor images;
compare each respective confidence score to a predefined threshold score;
determine that at least one confidence score satisfies the predefined threshold score; and
for the vendor image corresponding to the at least one confidence score determine to satisfy the predefined threshold score, automatically add a potential match including the corresponding vendor image to the list of potential matches.

19. The computer-readable storage media of claim 17, wherein the computer-executable instructions further cause the processor to:
receive, from the user computing device, an identification of a suitable match from the user from the list of potential matches; and
indicate that the search was successful.

20. The computer-readable storage media of claim 17, wherein the computer-executable instructions further cause the processor to:
receive, from the user computing device, an indication that the user identified no suitable matches from the list of potential matches; and
indicate that the search was unsuccessful.

21. The computer-readable storage media of claim 17, wherein the computer-executable instructions further cause the processor to:
search a plurality of vendor webpages for the plurality of vendor images to compare to the subject image, each vendor webpage including at least one vendor image of the plurality of vendor images; and
for each potential match, retrieve item characteristics for a clothing item pictured in the corresponding vendor image from the associated vendor webpage.

22. The computer-readable storage media of claim 17, wherein the computer-executable instructions further cause the processor to employ an object recognition component trained for recognizing clothing items to analyze the subject image and compare the plurality of vendor images thereto.

* * * * *